Feb. 8, 1927. 1,617,010
G. CONSTANTINESCO
CLUTCH AND UNIDIRECTIONAL DRIVING DEVICE
Filed Jan. 26, 1924   4 Sheets-Sheet 1
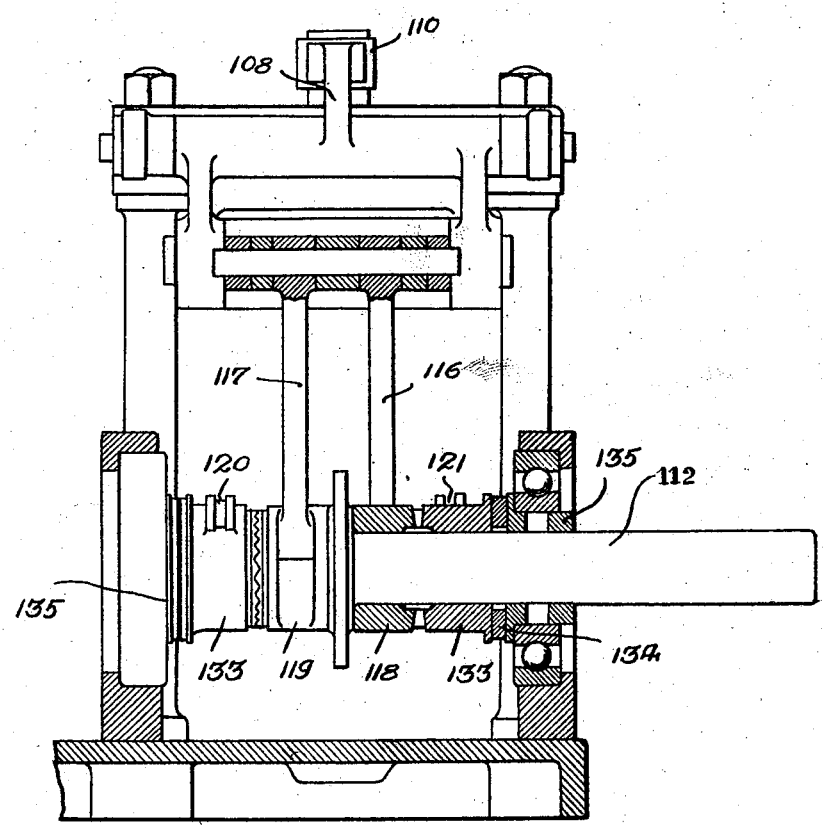
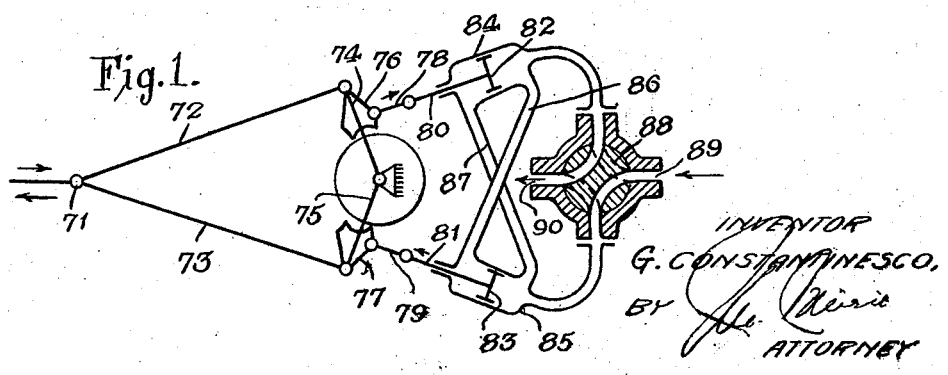

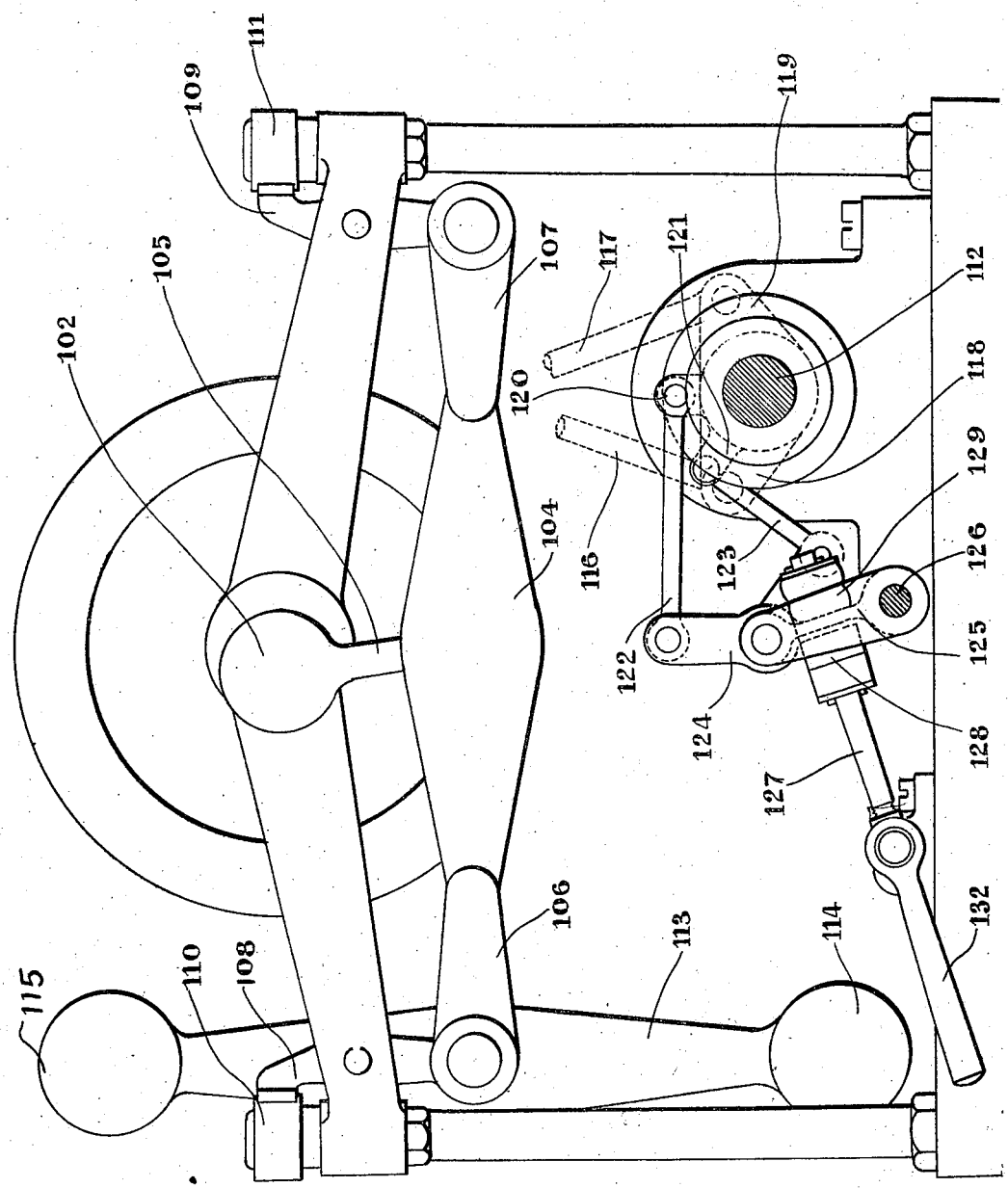

Feb. 8, 1927.

G. CONSTANTINESCO 1,617,010

CLUTCH AND UNIDIRECTIONAL DRIVING DEVICE

Filed Jan. 26, 1924     4 Sheets-Sheet 3

Patented Feb. 8, 1927.

1,617,010

UNITED STATES PATENT OFFICE.

GEORGE CONSTANTINESCO, OF WEYBRIDGE, ENGLAND.

CLUTCH AND UNIDIRECTIONAL DRIVING DEVICE.

Application filed January 26, 1924, Serial No. 688,789, and in Great Britain April 5, 1923.

The present invention relates to clutches and unidirectional driving devices for various purposes, particularly to devices for converting an oscillating motion to an intermittent rotary motion in one direction.

The invention is applicable to many types of ratchet devices particularly to such devices as are described in my U. S. specification Serial No. 653,774 (British 205,293).

In the said specifications I have described a clutch comprising a sliding member situated between an oscillating member and a rotating member and arranged so that relative movement of rotation between said sliding member and said oscillating member causes a movement of said sliding member at right angles to the movement of rotation with consequent engagement and jamming together of the three members, said sliding member having teeth or the equivalent on one side and smaller teeth or a friction surface on the other side brought into close engagement by the movement of said sliding member at right angles to the direction of rotation. In such device unless the clearance between the friction surface and the slider is extremely small in the free position there is a certain relative movement between the oscillating member and the slider which gives rise to shocks when the slider overruns the oscillator at the end of the driving stroke and if a rubber or other pad is employed as the friction surface, this relative movement increases as the pad becomes worn, so that the gear is apt to become noisy owing to shocks produced when the slider overtakes the oscillator.

The invention is also applicable to other types of ratchet devices and particularly to ratchets which are employed in combinations in which it is desired to maintain a definite mean position of the oscillating parts when there is no torque to be overcome at the driven shaft.

The invention consists in interconnecting the pawls, sliders or the like in two phase or polyphase operating unidirectional devices so that the sliders drive each other through a suitable connection anchored to an external point so that an external force may be applied to the interconnecting means.

The invention further consists in providing means whereby the mechanism can be reversed so as to produce rotation of the driven rotor in either direction as desired.

The invention further consists in the improved mechanism for converting oscillating motion into intermittent rotary motion hereinafter described.

Figure 1 shows a diagrammatic arrangement in which the pawls are hydraulically interconnected, the fluid pressure being regulated by fluid pressure produced by any external means (not shown);

Figure 2 shows a side elevation of a form of the invention in which the sliders or pawls are mechanically interconnected; also part of an apparatus by which power is applied to the oscillators;

Figure 3 is a sectional view of the same, while

Figure 6 is a side elevation of the reversing apparatus, while

Figure 4:
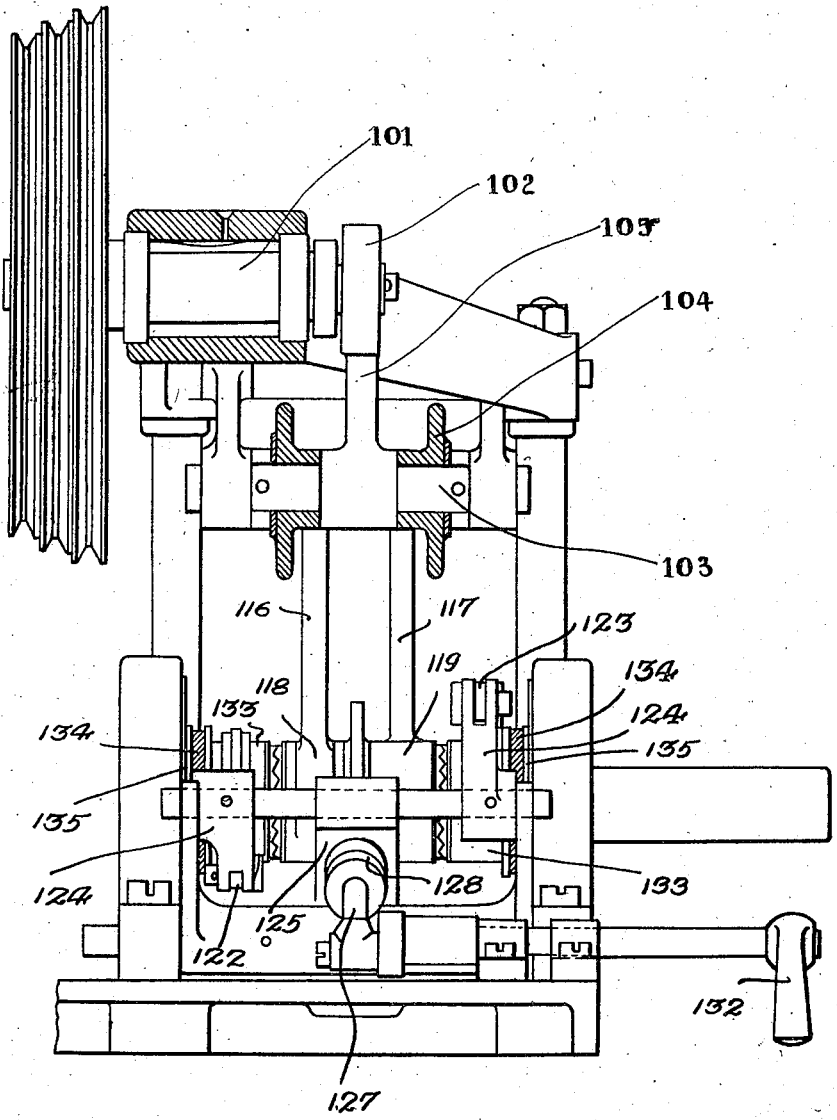
Figure 4 is a side elevation partly in section.

In the form of the invention shown in Figure 1, the oscillating driving pivot 71 is connected by rods 72, 73 to oscillating members 74, 75 carrying ratchet devices 76, 77, these ratchet devices being capable of acting in either direction. The ratchet devices are connected by links 78, 79 to the piston rods 80, 81 of pistons 82, 83 moving in cylinders 84, 85 which are interconnected by pipes 86, 87 and which are connected through a reversing valve 88 with a source of fluid pressure connected at 89 and an outlet for fluid at 90. The fluid pressure applied to the nozzle 89 may be obtained by any external means desired.

Figure 5:
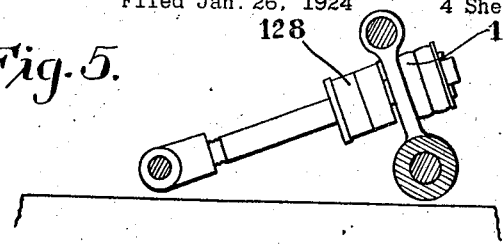
Figure 5 is a detailed view showing part of the reversing apparatus.
Figure 6:
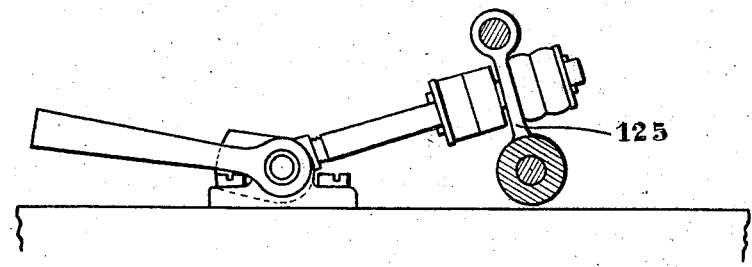
Figure 7:
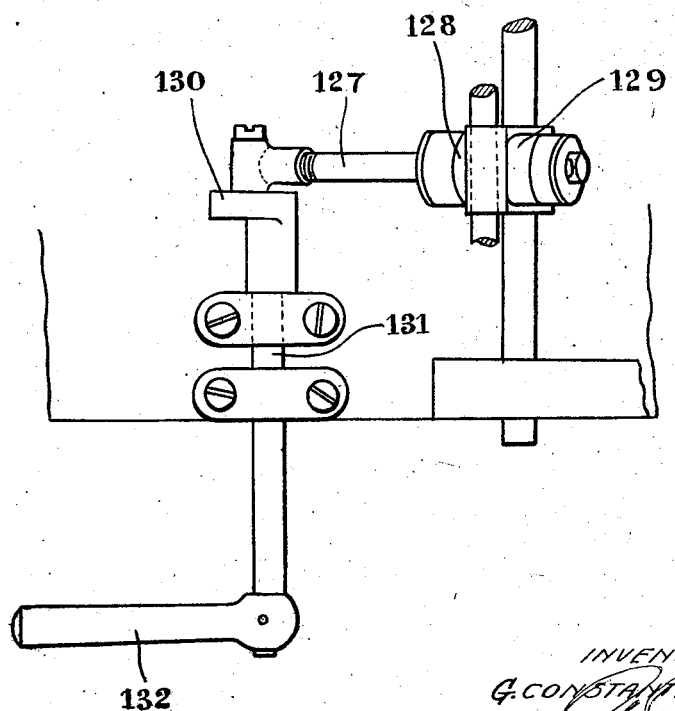
Figure 7 is a plan of the same.

Figures 2 to 7 show a form of the invention in which the grippers or pawls are mechanically interconnected. In these figures the invention is applied to the clutch described in my prior U. S. specification, Serial No. 653,774. They also show by way of illustration the application of this clutch modified according to my invention to a device for dividing the motion of a prime mover into two components which operate respectively upon an inertial mass and unidirectional driving devices which actuate a rotor the ratio of the two components varying as the torque opposing the motion of the rotor. As the principle of this mechanism is fully explained in my former U. S. specification Serial No. 653,774 and it forms no part of the present invention it is not necessary to describe it in great detail. The prime mover drives a main shaft 101 having an eccentric 102 driving on to the central pivots 103 of the floating lever 104 by means of the strap 105. The floating lever 104 is connected at its ends to a pair of links 106, 107 which are pivoted to levers 108, 109 whose upper ends have their movement restrained by stops 110, 111 one of these stops or the other coming into operation according to the direction of rotation of the driven rotor on the shaft 112. The levers 108, 109 are pivoted in the frame of the machine and one end of the floating lever 104 oscillates the lever 113 carrying at its ends inertia masses 114, 115 while the other end of the floating lever 104 is connected by links 116, 117 with a pair of oscillating members 118, 119 each of which acts through a sliding member 133 having large teeth on one side and a friction surface 134 on the other side to grip rotary members 135 on the driven shaft 112 alternately. The construction and operation of these gripping or sliding members is described in my U. S. specification 653,774 referred to above. Fixed on each sliding member there are provided bosses 120, 121 connected by rods 122, 123 with a bell crank lever 124 which is pivoted on a link 125 capable of movement about a fixed pivot 126. Threaded through the link 125 there is provided an actuating rod 127 carrying flanges with buffers 128, 129 between them and the link 125. The rod 127 is connected to an eccentric 130 on a shaft 131 pivoted in the frame of the machine and the handle 132 is provided on this shaft by which either one or the other of the buffers 128, 129 may be brought in contact with the link 125. By this means the pull in one direction or the other may be exerted on the two sliders so that by merely moving the handle 132, the direction of rotation may be reversed, as explained in my prior U. S. specification No. 653,774 already referred to.

I claim—

1. A ratchet or like device for converting oscillating into rotary motion, comprising in combination a rotor, a plurality of oscillating members actuated from an external source, gripping members intermittently actuated by the oscillators and acting in different phases on the rotor, and means for interconnecting the gripping members, such means being anchored to a stationary point so that the gripping members are influenced by an external force in addition to the driving force, causing each gripping member during its driving stroke to act upon the other member or members positively during the return stroke.

2. A ratchet or like device for converting oscillating into rotary motion, comprising in combination a rotor, a plurality of oscillating members actuated from an external source, gripping members intermittently actuated by the oscillators and acting in different phases on the rotor, means for interconnecting the gripping members, such means being anchored to a stationary point so that the gripping members are influenced by an external force in addition to the driving force, causing each gripping member during its driving stroke to act upon the other member or members positively during the return stroke, and means for altering the interconnections so as to make the action of the gripping members upon the rotor reversible and thus to drive the rotor in either direction.

3. A ratchet or like device for converting oscillating into rotary motion comprising in combination a rotor, two oscillating members linked to a common driving pivot so as to actuate them in opposite sense, two gripping members actuated by the oscillating members and acting in different phases on the rotor, and a second pair of links connecting each gripper to arms on a common stationary shaft, the arms being so arranged that one gripper drives the other in opposite sense.

4. A ratchet or like device for converting oscillating into rotary motion comprising in combination a rotor, two oscillating members linked to a common driving pivot so as to actuate them in opposite sense, two gripping members intermittently actuated by the oscillating members and acting in different phases on the rotor, a second pair of links connecting each gripper to arms on a common shaft, the arms being so arranged that one gripper drives the other in opposite sense, a link pivoted to a fixed point with its movable end carrying the said shaft, and means for moving the link from one stationary position to another and maintaining it therein for reversal of the rotor.

In testimony whereof I have signed my name to this specification.

GEORGE CONSTANTINESCO.